United States Patent [19]

Oules

[11] 4,214,127
[45] Jul. 22, 1980

[54] INTRINSICALLY SAFE TELEPHONE NETWORK

[75] Inventor: Michel L. Oules, Sèvres, France

[73] Assignee: S.I.L.E.C.-Division Signalisation Industrielle, Paris, France

[21] Appl. No.: 907,051

[22] Filed: May 17, 1978

[30] Foreign Application Priority Data

May 18, 1977 [FR] France .................. 77 15444

[51] Int. Cl.² ............................................. H04M 1/18
[52] U.S. Cl. ........................... 179/2 R; 179/81 R
[58] Field of Search ............... 179/81 R, 81 B, 1 R, 179/1 H, 2 R, 2 BC, 28, 37

[56] References Cited
U.S. PATENT DOCUMENTS 4,064,366  12/1977  Wheatley et al. ............... 179/81 R

FOREIGN PATENT DOCUMENTS

| | | | |
|---|---|---|---|
| 1213004 | 3/1966 | Fed. Rep. of Germany | 179/81 R |
| 1406586 | 6/1965 | France | 179/81 B |
| 928091 | 6/1963 | United Kingdom | 179/81 B |
| 1041329 | 9/1966 | United Kingdom | 179/81 B |

Primary Examiner—Bernard Konick
Assistant Examiner—Joseph A. Popek
Attorney, Agent, or Firm—Cushman, Darby & Cushman

[57] ABSTRACT

A telephone network which can be placed in a dangerous or explosive atmosphere is disclosed. The telephone network includes a manual exchange, one or more telephone sets and one or more limiter-repeater circuits connected with the telephone sets by telephone lines. The one or more telephone sets do not include any supply sources, but each include a solid-state amplifier which requires only a low supply voltage and has low energy dissipation. The solid state amplifier is supplied with operating voltage from supply sources in the exchange through the telephone line.

6 Claims, 2 Drawing Figures

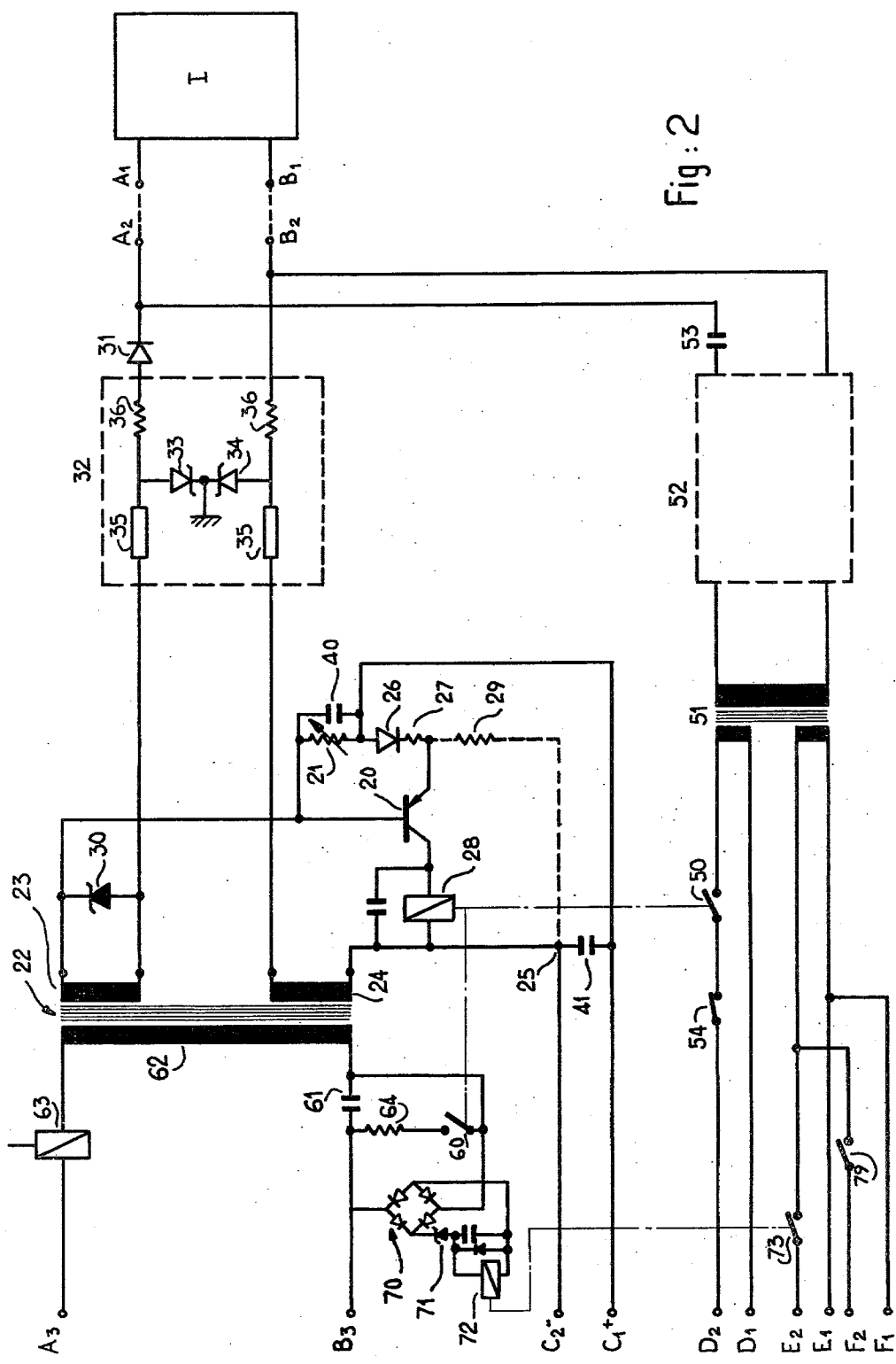
Fig:2 und 4,214,127

INTRINSICALLY SAFE TELEPHONE NETWORK

BACKGROUND OF THE INVENTION

Description of the Prior Art

The invention relates to an intrinsically safe telephone network.

An intrinsically safe telephone network comprises two parts, one of which, which comprises mainly the telephone set and the line connected thereto, can be placed in a dangerous atmosphere without any specific care, that is the currents, voltages and impedances of the line and the telephone set are such that they are not able in any case to cause a spark capable of triggering an explosion in an explosive gas. Such intrinsically safe telephone networks apply more particularly to utilization in mines such as charcoal mines wherein fire-damp explosions are to be avoided.

One of the main difficulties of concern with the intrinsically safe circuits is the fact that all the electrical signals circulating in the line should be at a relatively low level. As a consequence, the attenuation on the line is critical where, for example in case of charcoal mines, the telephone lines in the galleries may have lengths in the range of some tens of kilometers.

French Pat. No. 1,406,586 aims to solve this problem of the line attenuation by arranging at each of the telephone set a local battery feeding amplifier and oscillator circuits. Accordingly, relatively complex circuits were present in the telephone set.

SUMMARY OF THE INVENTION

An object of the invention is to provide an intrinsically safe telephone network wherein the part arranged in the dangerous area is particularly simple.

Another object of the invention is to provide an intrinsically safe telephone network controllable from a manual or semi-automatic exchange.

BRIEF DESCRIPTION OF THE DRAWINGS

Other objects and advantages of the present invention will be better understood with reference to the following description of a preferred embodiment taken in connection with the attached drawings wherein:

FIG. 2 shows a repeated-limiter circuit according to the invention.

DESCRIPTION OF A PREFERRED EMBODIMENT

Figure 1:
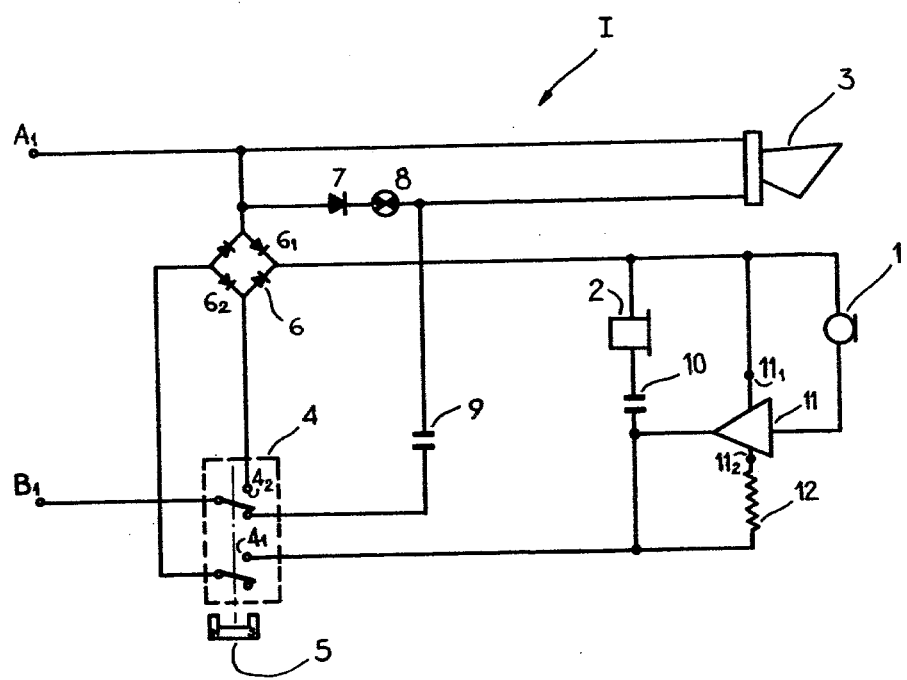
FIG. 1 shows circuits present at the level of a telephone set according to the invention.

As shown in FIG. 1, a telephone set I according to the invention comprises a microphone 1, an earphone 2, and a loud-speaker 3. A set of switches 4 is actuated in dependence on whether that the telephone handset is on-hook or off-hook. Typically, this set of switches 4 is actuated by the hooks of the telephone set or, in a variant, it can be actuated by a magnet 5 associated with the telephone handset. In FIG. 1, the switch 4 is shown in the on-hook position. The circuit of the telephone set further comprises a rectifying bridge 6, a diode 7, an optional light display 8, capacitors 9 and 10, an amplifier 11 and a resistor 12 connected as shown. This circuit is connected to terminals $A_1$ and $B_1$ which are connected to the telephone line. Accordingly, when the telephone set is in the on-hook state, as shown in the figure, the capacitor 9, serially connected with the terminal $B_1$ causes the telephone set to operate as an open circuit for any d.c. signal present at the terminals $A_1$ and $B_1$. Only an a.c. signal can be transmitted between the terminals $A_1$ and $B_1$ by being derived from the parallel circuit of the light display 8, and the loud-speaker 3. Accordingly, a.c. call signals or a.c. alarm signals sent to the terminals $A_1$ and $B_1$ cause simultaneously the lighting (and possibly the flickering) of the light display 8 and a sound emission through the loud-speaker 3.

In case the telephone handset is off-hook, the switch 4 is switched to the position other than the one shown on FIG. 1. In this case, the loud-speaker 3 is disconnected. A d.c. voltage, present at the terminals $A_1$ and $B_1$, with a positive polarity at the terminal $A_1$, will flow from the terminal $A_1$ through the diode $6_1$ of the rectifying bridge 6, the supply terminals $11_1$ and $11_2$ of the amplifier 11, the resistor 12, the terminal $4_1$ of the switch 4, the diode $6_2$ of the rectifying bridge 6, and the terminal $4_2$ of the switch 4, towards the negative terminal $B_1$ of the line. Accordingly, on the one hand, the amplifier 11 is supplied, and on the other hand, the resistance seen from the terminals $A_1$ and $B_1$ for a d.c. current is relatively low. Although this is not strictly exact, it will be said hereafter for the sake of simplicity that, when the telephone handset is off-hook, the terminals $A_1$ and $B_1$ are short-circuited for the d.c. current.

The a.c. speech currents will flow through similar paths but through the microphone 1 and the amplifier 11 on the one hand, and the earphone and the capacitor 10 on the other hand. Therefore, the telephone set circuit is particularly simple according to the invention. The amplifier 11 is a solid-state amplifier necessitating a low supply voltage and having a low energy dissipation. It allows solving the problems of the line attenuation of the signals from the microphone 1.

FIG. 2 shows a simplified circuit of a limiter-repeater according to the invention arranged between terminals $A_2$ and $B_2$, connected through the telephone line to the terminals $A_1$ and $B_1$ of a telephone set, and terminals $A_3$ and $B_3$ connected with a manual exchange. This limiter circuit is also connected with terminals $C_1$ and $C_2$ of a d.c. supply source; terminals $D_1$ and $D_2$ of a supply source providing a call return signal, for example, an a.c. voltage of 400 Hertz chopped each second; terminals $E_1$ and $E_2$ of an a.c. call signal, for example, an a.c. signal at a frequency of 1,000 Hertz modulated at 15 Hertz; and terminals $F_1$ and $F_2$ of an alarm a.c. signal source, for example, an a.c. current supply source at a telephone frequency modulated between 600 and 1,800 Hertz at a more or less rapid rythm.

The circuit of FIG. 2 will be first disclosed in relationship with the path followed by the d.c. current from the source $C_1,C_2$. Firstly, when the telephone handset is on-hook, as seen previously, the circuit between the terminals $A_1$ and $B_1$ is equivalent to an open circuit for the d.c. current. So, the positive voltage at the terminal $C_1$ is applied to the base of a transistor 20 through a resistor 21 and, accordingly, this transistor is placed in an OFF-state and no current can flow therethrough. As a consequence, substantially no d.c. current flows between the terminals $C_1$ and $C_2$ with the exception of the very low current through the high value resistor 29.

In case the telephone handset is off-hook, it has been explained in the above that the terminals $A_1$ and $B_1$ substantially correspond to a short-circuit for the d.c. current. Accordingly, a current flows from the positive terminal $C_1$, through the resistor 21, the first secondary 23 of a speech current transformer 22, the terminals $A_1$, $A_2$, $B_1$ and $B_2$, the second secondary 24 of the transformer 22, towards the connection point 25 and the terminal $C_2$. Accordingly, the potential at the base of the transistor 20 drops and, by suitably choosing the value of the resistor 21, becomes negative so that the transistor 20 is put ON (conductive state). Then, a second conduction path is caused for the d.c. current from the terminal $C_1$, through a diode 26, a resistor 27, the emitter-collector path of the transistor 20 and a relay coil 28, to the negative terminal $C_2$ of the d.c. supply source. The values of the resistors 21 and 27 are adjusted in connection with the length of the line between the terminals $A_2$, $B_2$ and $A_1$, $B_1$ so that the d.c. current flowing between the terminals $A_1$ and $B_1$ is sufficient for feeding the amplifier 11 while the current in the relay coil is sufficient for exciting said coil. The resistor 29, inserted between the resistor 27 and the junction 25, has practically no operational function. This resistor has a very high value and has a security function.

The d.c. current circuit further comprises, as security elements, a Zener diode 30 connected at the terminals of the first secondary of the transformer 22, a diode 31 serially connected on the telephone line and a security barrier 32 on the telephone line. This security barrier comprises, between the two wires of the line, Zener diodes 33 and 34, the junction of which is connected with the ground and, in series on each wire of the line, a fuse 35 and a resistor 36. The speech signals incoming or outgoing from the transformer 22 flow, from the terminal $A_2$, through the first secondary 23, a first and a second capacitor 40 and 41, the junction 25, the second secondary 24 of the transformer 22, to the terminal $B_2$ or inversely.

When the telephone handset arranged in the explosive atmosphere is off-hook, a d.c. current crosses the relay coil 28. This coil operates in order, on the one hand, to transmit to the manual exchange connected with the terminals $A_3$ and $B_3$ the information that a handset is off-hook and wishes to be connected with the manual exchange, and on the other hand, to transmit back to the earphone of the telephone handset, a call return signal for indicating to the caller that the network is operating and the manual exchange is warned.

For transmitting a call return signal, the relay coil 28 operates on a first relay contact 50 in series with the primary of a transformer 51 connected to the terminals $D_1$, $D_2$ of the call return signal source. The transformer 51 sends this call return signal to the terminals $A_2$ and $B_2$ through a security barrier 52 similar to the security barrier 32 disclosed hereabove. In order to avoid transmission of the d.c. signals flowing between the terminals $A_2$ and $B_2$, a capacitor 53 is also serially connected with the secondary of the transformer 51.

For warning the manual exchange of the fact a telephone handset is off-hook, the coil 28 operates a second relay contact 60. This second relay contact 60 is arranged in parallel with a capacitor 61, itself serially connected with the terminal $B_3$, the primary 62 of the speech transformer 22 and a relay coil 63. So, when the relay contact 60 is closed due to the action of the coil 28, a d.c. voltage present between the terminals $A_3$ and $B_3$ flows through this closed contact 60, a current-limiting serial resistance 64, the primary 62 of the transformer 22, and the coil 63 for exciting said coil 63. The coil 63 typically actuates suitable contact for providing light and sound warning signals in the manual exchange. The operator of the manual exchange connects then to the terminals $A_3$ and $B_3$ and actuates a relay 54 in series with the terminals $D_1$ and $D_2$ connected to the call return signal source for disconnecting this call return signal and establishes a talk with the caller.

Conversely, when it is wished to call one of the telephone sets arranged in the explosive area connected to the terminals $A_1$ and $B_1$, a signal having a sufficient intensity is sent from the manual exchange between the terminals $A_3$ and $B_3$. This signal operates through a rectifying bridge 70 for sending a current through a Zener diode 71 and a relay coil 72. This relay coil 72 actuates the relay contact 73 in order to establish, through the transformer 51 and the security barrier 52 above disclosed, an a.c. connection between the terminals $E_1$ and $E_2$ and $A_2$ and $B_2$ respectively. Accordingly, a call signal is transmitted to the loud-speaker 3 and the light display 8 shown in FIG. 1. An action is simultaneously carried out for opening the relay contact 54. Thus, as soon as the called telephone set has been put off-hook, the relay 28 operates on the contact 50, which has no effect due to the open state of the contact 54, and on the contact 60 for inhibiting the action of the relay coil 72 operating onto the contact 73. A conversation can then be established between the manual exchange and the called telephone set.

FIG. 2 also shows a relay contact 79 serially connected with the terminals $F_1$ and $F_2$ for establishing an a.c. connection between the terminals $F_2$, $F_1$ and $A_2$, $B_2$. This contact 79 can be actuated from the manual exchange and permits sending on the loudspeaker of the telephone set an alarm signal.

A limiter-repeater will be associated with each telephone set, but the various supply sources as well as, of course, the manual exchange will be common to a plurality of limiter-repeaters.

It will be also noted that the terminals $F_1$ and $F_2$ adapted to provide an alarm signal to a plurality of repeaters and telephone sets can also be connected to an intrinsically safe amplifying device permitting sending word messages towards the plurality of loud-speakers of the telephone sets.

In view of the great simplicity of the intrinsically safe circuit of the invention, and of the small number of relay coils which are to be actuated for permitting the operation of the device, this circuit is particularly suitable to a connection with a manual exchange associated with a small commutator permitting operating the telephone network in a semi-automatic mode. This commutator, telecontrolled by the operator of the manual exchange, actuates the various relays for establishing the communication. For applications to telephone set utilized in mines, fully automatic exchanges are, however, not wished. On the contrary, it is wished to maintain manual exchanges which provide a greater security and permit, in particular due to the absence of calling dials, a very easy operation.

While the present invention has been described in relation with preferred embodiments thereof, it will be apparent to those skilled in the art that many alternative embodiments and modifications thereof may be made within the scope of the invention.

What is claimed is:

1. An intrinsically safe telephone network comprising a manual exchange, various supply sources including a d.c. supply source, all the supply sources being at said exchange, a limiter-repeater circuit coupled to said manual exchange and said d.c. supply source, a remote telephone set and a telephone line, interconnecting said limiter-repeater circuit and said telephone set, wherein the telephone set comprises a solid-state amplifier serially connected with a microphone, said amplifier being supplied with an operating voltage from said d.c. supply source only when the telephone handset is off-hook, and a loud-speaker, said loud-speaker being a.c. connected by a capacitive connection to the telephone line when the telephone handset is on-hook.

2. A telephone network according to claim 1 including control means and wherein the limiter-repeater circuit comprises a switching means, said switching means operative in response to the telephone set being off-hook and the amplifier being accordingly supplied with operating voltage from said d.c. supply source, to also couple said control means to said d.c. supply source.

3. A telephone network according to claim 2 wherein said control means actuates a first contact for providing to said exchange a signal indicating that said handset of said telephone set is off-hook, and also actuates a second contact for connecting a call return signal source to the earphone of the calling telephone handset.

4. A telephone network according to claim 2 wherein said switching means is a transistor.

5. A telephone network according to claim 4 wherein the first d.c. current path comprises an adjustable resistor and the portion of the telephone line comprised between the limiter-repeater and the telephone set.

6. A telephone network according to claim 5 wherein the second path for the d.c. current comprises a diode, a resistor, the emitter-collector circuit of said transistor and a relay coil.

* * * * *